United States Patent Office 3,391,101
Patented July 2, 1968

3,391,101
PIPE SEALANT COMPOSITIONS
Peter B. Kelly and Gayle D. Edwards, Austin, Tex., assignors to Jefferson Chemical Company, Inc., Houston, Tex., a corporation of Delaware
No Drawing. Filed Aug. 10, 1964, Ser. No. 388,675
4 Claims. (Cl. 260—37)

ABSTRACT OF THE DISCLOSURE

Pourable sealant compositions which are form-retaining after a cure time of about 10 to 30 minutes are possible. A one-shot polyurethane sealant composition which, after being poured into a mold and sufficiently cured to allow removal of the mold after less than about 30 minutes cure, is produced by reacting a mixture of aromatic isocyanates having an average functionality of about 2.1 to about 2.5 and a polyol component which is a mixture of 80 to 95 wt. percent of a polyoxypropylene diol and 20 to 5 wt. percent of a polyoxypropylene triol. The diol components have an average molecular weight of about 1,000 to about 5,000 and a high percent of primary hydroxyl groups. The triol component has a molecular weight of about 1,000 to about 6,000. The polyol component is mixed with the isocyanate components such as the resulting mixture contains about 1.1 to about 1.7 mol equivalents of isocyanate group per mol of hydroxyl group.

---

This invention relates to sealant compositions. More particularly, this invention relates to mobile, one-shot polyurethane compositions for sealing pipe joints, such as clay-pipe joints.

In the sealing of pipe joints, such as clay-pipe joints, it is necessary to establish an impermeable seal between spaced surfaces of the ends of the pipe which are to be sealed together and it is necessary that the seal have prolonged resistance to deterioration. In addition, a seal should have sufficient flexibility to permit limited relative movement between coupled sections of pipe. A wide variety of materials have been proposed and used for this general purpose, and although the results have been generally satisfactory, there is still much to be desired.

One general type of pipe sealant composition that has been proposed is a composition which can be poured into a temporary mold attached to the pipe. For this purpose, it is desirable to use a material which can be poured into the mold as a liquid but which will shortly thereafter harden to provide an adherent seal having the desired properties of limited flexibility and significant resistance to deterioration.

In particular, and with reference to clay pipe used for subsurface installations, it is normally desirable, if a pourable sealant is to be employed, to utilize a manufacturing system wherein temporary molds are circumferentially spaced on both ends of a vertically supported pipe section to provide channels into which the sealant may be poured. When the sealant has hardened, either completely or at least to an extent such that it is self-form retaining, the temporary molds are removed. Manifestly, of course, the sealant composition must not adhere too tightly to the surface of the mold but, on the other hand, must be capable of forming a strong bond with the surface of the pipe to which it is to remain attached. It may be desirable to coat the pipe ends with a primer prior to molding the sealant.

One general class of materials that has been considered for this type of application are the so-called "polyurethanes," which are synthetic polymeric materials prepared by the catalytic or non-catalytic reaction of a polyisocyanate with a polyhydroxy compound. In preparing polymers of this nature, a linear chain extension reaction occurs between hydroxyl groups and isocyanato groups to provide interconnecting urethane bonds containing reactive secondary amino groups. The secondary amino groups, on further reaction with isocyanato groups, cross-link the polymer chains to provide the final product. Since two distinct chemical reactions are involved which have different orders of reactivity, it has heretofore been considered desirable to conduct the overall process sequentially. This has been classically accomplished by first preparing a so-called "prepolymer" or a "quasi-prepolymer" by reacting a diisocyanate with a polyether polyol. The isocyanate component is reacted with a polyhydroxy component in a molar ratio such that the reaction product will contain free isocyanato groups. Manifestly, when it is desired to provide sealant compositions, the prepolymer that is formed should be liquid or liquefiable under conditions of use.

When it is desired to provide a final polyurethane product, the prepolymer is mixed with an additional quantity of polyether polyol, normally in the presence of a catalyst, to provide a pipe sealant composition that can be poured into a space to be filled and permitted to cure to a desired extent. This system, though workable, is attendant with a great many disadvantages, particularly because of the sequential reaction steps that are involved. For example, since one of the components (the prepolymer) is only partially reacted and is still reactive, the prepolymer has only limited storage stability.

In acordance with the present invention, pourable pipe sealant compositions are provided which have the properties normally obtained with polyurethane sealant compositions prepared by the above-described prepolymer method wherein the chain extension and cross-linking reactions are caused to occur simultaneously after mixing of a polyisocyanate component with a polyfunctional hydroxyl component. Although it is not absolutely necessary to employ a catalyst in accordance with the present invention, it is normally desirable to use a catalyst in order to accelerate the reaction rates and, hence, to decrease overall reaction time. However, catalytic considerations are secondary, and therefore, it is preferable to employ a catalyst having comparatively mild activity or else to use only a small amount of a more highly reactive catalyst.

The pourable sealant compositions of the present invention are composed of an aromatic polyisocyanate component comprising a mixture of an aromatic diisocyanate with an aromatic isocyanate containing three or more isocyanato groups per molecule. Preferably, the diisocyanate will comprise from about 30 to about 80 wt. percent of the mixture, the balance being primarily aromatic polyisocyanates having a functionality greater than two (e.g., three to six).

The polyether component to be used in accordance with the present invention is composed of a mixture of a minor amount of a polyoxypropylene polyether triol with a major amount of a polyoxypropylene diol; which polyether component contains from about 10 to about 60 mol percent of primary hydroxyl groups (based on the total mols of hydroxyl groups per average molecule).

The primary hydroxyl groups are preferably obtained by ethoxylating the polyoxypropylene diol with a small amount of ethylene oxide.

A preferred polyoxypropylene diol component will have a molecular weight within the range from about 1,000 to about 5,000 having 10 to 60 mol percent primary hydroxyl groups and containing from about 1 to about 15 wt. percent of ethylene oxide. More preferably, the diol will have about 30 to 50 mol percent of primary hydroxyl groups and contain from about 5 to about 10 wt.

percent of ethylene oxide. The polyoxypropylene diol may be prepared in a conventional manner by reacting propylene oxide with an initiator containing two reactive hydrogen atoms, in one or more stages, in the presence of an alkaline catalyst to provide an intermediate having about the desired molecular weight. The alkoxylation is then completed by ethoxylating the polyoxypropylene diol with ethylene oxide in any desired conventional manner in the presence of an alkali catalyst.

The percentage of primary hydroxyl groups in the finished diol component may be controlled within reasonable limits by controlling the amount of ethylene oxide that is employed. Theoretically, the reaction of one mol of ethylene oxide with one mol of polyoxypropylene diol intermediate will provide a final product having 50 mol percent of primary hydroxyl groups. In practice, however, it is necessary to use an excess of ethylene oxide even to approach this high a primary hydroxyl group content, because of a pronounced preferential reaction of ethylene oxide with the primary hydroxyl groups on previously ethoxylated chains. Moreover, unless a gross excess of ethylene oxide is employed, the same tendency of ethylene oxide to thus react will prevent the formation of a final diol product having more than about 60 mol percent of primary hydroxyl groups.

The trifunctional polyhydroxy component is preferably a polyoxypropylene triol prepared by the reaction of propylene oxide with a trifunctional initiator (i.e., one containing three reactive hydrogen atoms per molecule) in any suitable conventional manner in one or more stages in the presence of an alkali catalyst to provide a triol having an average molecular weight within the range of from about 1,000 to about 6,000. If desired, the triol preparation method may include a terminal ethoxylation step to provide a triol component containing from about 10 to about 60 mol percent of primary hydroxyl groups. Since average functionality and average molecular weight are the primary criteria, it will be apparent that the triol component can be provided by mixing a diol and a tetrol in order to provide a triol having an average functionality of about three. However, this can be done only to a limited extent since the polyol component of the present invention should be composed of more than 50 wt. percent of diol.

Preferably, from about 80 to about 95 parts by weight of diol component will be mixed with, correspondingly, from about 20 to about 5 parts by weight of triol component.

The polyisocyanate component to be used in accordance with the present invention is preferably composed of from about 80 to 20 wt. percent of an aromatic diisocyanate and, correspondingly, 20 to 80 wt. percent of aromatic polyisocyanates having a functionality greater than two. However, it is necessary that the isocyanate component have an average overall functionality of not more than about 2.5.

As a consequence, comparatively inexpensive isocyanate compositions can be employed with good results in the practice of the present invention. For example, mixed (phenylmethane)isocyanates may be used which are prepared by the reaction of an aromatic compound (e.g., aniline) with formaldehyde to provide a reaction product which is converted to polyisocyanates with only minimum purification. Of course, more expensive isocyanate components such as tolylene diisocyanates, diphenylmethane diisocyanates, naphthylene triisocyanates, or mixtures of any of these, etc., may be employed. However, there is an advantage to the present invention in that it is not mandatory to use expensive comparatively pure isocyanates in order to obtain pipe sealant compositions having excellent physical properties. In addition, the crude isocyanate mixtures that are preferably employed (composed of diphenylmethane diisocyanates and higher polymers thereof) are significantly less toxic than more expensive and more volatile isocyanates such as crude mixtures of tolylene diisocyanates. However, for certain purposes it may be advantageous to add relatively small amounts of toluene diisocyanate or other difunctional isocyanate to the crude diphenylmethane diisocyanates to reduce the amount of cross-linking to enhance elongation and tear properties.

The molar ratio of isocyanate components to polyhydroxy components should be such that the isocyanato groups are present in at least a molar equivalent amount with respect to the hydroxyl groups. More preferably, an excess of isocyanato groups will be provided, such that the final composition will contain from about 1.1 to about 1.7 mol equivalents of isocyanato groups per mol equivalent of hydroxyl groups.

One of the problems that is encountered in the practice of the present invention is the formation of gaseous bubbles in the final sealant composition formed by the reaction of hydroxyl groups of water with isocyanato groups. This is a problem, because water reacts with isocyanato groups and liberates carbon dioxide as a by-product. It is therefore desirable to minimize the water content of the sealant compositions of the present invention. Best results are obtained when the water content is less than about 0.02 wt. percent.

Another problem that is sometimes encountered is the formation of air bubbles during the curing process. Air can dissolve in the components because of its solubility. However, as the after mixing and as polymerization proceeds, the curing reactions will decrease the solubility of the air, causing it to come out of solution.

This problem can be minimized by mixing the isocyanate component with the polyhydroxy component under a mild vacuum. Of course, the two components can be "degased" separately prior to mixing by vacuum treating, heating, or equivalent processes or the "degassing" step can be conducted after mixing of the two components.

A catalyst is not absolutely essential to the practice of the present invention, but can be employed advantageously to minimize cure time when the pot life of the pourable composition is not critical. When a catalyst is to be employed, it is preferably incorporated into the polyol component so that it is necessary to store only two components. Thus, the isocyanate component can be stored separately from the polyol component, and the two components can then be mixed at about the time of use. When a catalyst is to be employed, it is preferable to employ an organo metallic catalyst such as an oxide, carboxylate or alcoholate of a metal such as tin, lead or calcium. Representative examples of effective tin catalysts are dibutyltin diacetate, dibutyltin dilaurate, dibutyltin di-2-ethylhexoate, dibutyltin oxide, dibutyltin monomethoxy methyl maleate, tributyltin 2-ethylhexoate, monobutyltin tri-2-ethylhexoate, bis(tributyltin)oxide, bis(tributyltin) tetrapropenyl succinate, bis(tributyltin)n-nonyl succinate, bis(tributyltin)malonate, and the corresponding lead and calcium compounds. In general, from about 0.05 to about 5 wt. percent of catalyst should be employed, based on the weight of the polyol.

The pourable sealant compositions of the present invention are characterized by cure times, to adherent self form-retaining condition (at least semi-rigid), of from about 10 to about 30 minutes. Of course, final cure may require a considerable period of time, such as several days.

With compositions of the present invention having pot lives of from about 1 to about 30 minutes, it is possible to fabricate the sealant rings in a clay pipe manufacturing plant without the necessity of employing a separate assembly line. For example, a clay pipe, after having been formed and cured, may be hung on a relatively short conveyor. A temporary mold is placed within the female end of the pipe and about the male end of the pipe, and the pourable sealant composition of the present invention is simultaneously poured into the two mold pans. By the time the pipe reaches the end of the assembly line (10 to 30 minutes), the sealant composition is sufficiently cured to permit removal of the mold. For this application, it is preferable to employ a catalyst which is wholly or partially selective for the polyol hydroxyl-isocyanato group reaction, but is substantially ineffective as a catalyst for the water-isocyanato reaction. Preferred catalysts include lead octoate, lead naphthenate, lead toluate, lead resinoate, and the corresponding zinc, copper and calcium salts. Tertiary amine catalysts are generally less desirable, since they tend to or even actively promote the water-isocyanato reaction.

The pipe sealant compositions of the present invention will also preferably contain suitable fillers of the type known to those skilled in the art. The filler functions to improve the hardness of the final sealant composition. Examples of suitable fillers that may be employed include amorphous silica, carbon black, treated and untreated clays and similar unreactive organic materials. In general, the filler comprises from about 10 to about 60 wt. percent of the final composition.

It is to be observed in passing, that the use of a polypropylene glycol having up to 60 mol percent of primary hydroxyl groups within the weight range given above provides for good results. However, the use of greater amounts of glycol is unsatisfactory in that it tends to prolong cure time and to impair the compressive properties of the product.

On the other hand, if an excessive amount of the triol component is used, the properties of the final composition are adversely affected. In particular, tear strength and tensile strength are adversely affected.

The present invention will be further illustrated with respect to the following specific examples which are given by way of illustration and not as limitations on the scope of this invention. Where parts are given, they are parts by weight.

Example I

Commercial clay-pipe sealants cure sufficiently for removal from the mold in 15 minutes. In order to formulate urethane sealants for this service ethylene oxide capped diol-triol mixtures could be used. A suitable mixture for such service is:

|  | Grams |
|---|---|
| 4,000 M.W. ethylene oxide terminated polyoxypropylene diol containing about 34 mol percent primary hydroxyl groups | 100 |
| 3,000 M.W. ethylene oxide terminated polyoxypropylene triol containing about 35 mol percent primary hydroxyl groups | 50 |
| Amorphous silica | 150 |
| Methylene bis-phenoxyethanol | 17 |
| Lead octoate | 5 |
| Polyarylene polyisocyanate (mixture of diphenylmethane diisocyanate and higher polymers containing about 45 wt. percent dimer) | 47 |

The first five ingredients are thoroughly mixed and degassed and the isocyanate is added. This mixture is poured into a mold and cures sufficiently for removal in 15 minutes. Properties of a cured specimen (seven days) are:

| | |
|---|---|
| Tensile strength, p.s.i. | 600 |
| Ultimate elongation, percent | 120 |
| Hardness, Shore "A" | 78 |

Example II

As further examples, similar compositions were prepared in the manner described above with respect to Example I, except that the diol had an average molecular weight of about 2,050, contained about 2½ wt. percent ethylene oxide and had a primary hydroxyl content of about 34%. Preparations that were made and the results that were obtained are set forth in the following table:

TABLE I

Preparations

| | Grams |
|---|---|
| Diol of Ex. I | 450 |
| Triol of Ex. I | 55 |
| Silica | 400 |
| Carbon black | 50 |
| Lead octoate soln. (24% Pb in mineral spirits) | 7–25 |
| Polyarylene polyisocyanate | 100 |
| Diol of Ex. I | 425 |
| Triol of Ex. I | 75 |
| Silica | 400 |
| Carbon black | 50 |
| Lead octoate soln. (24% Pb in mineral spirits) | 7–25 |
| Polyarylene polyisocyanate | 90 |

PERFORMANCE

| | | |
|---|---|---|
| Tensile strength, p.s.i. | 662 | 643 |
| Ultimate elongation, percent | 110 | 90 |
| Hardness, Shore "A" | 76 | 77 |
| Compression set, percent | <1.0 | <1.0 |

Having described our invention, what is claimed is:

1. A sealant composition comprising the filled catalytic reaction product of a polyarylene polyisocyanate component with a polyol component, said polyisocyanate component comprising a mixture of an aromatic diisocyanate with a polyarylene isocyanate containing more that two isocyanato groups per molecule, said mixture having an average functionality within the range of about 2.1 to about 2.5, said polyol component comprising a mixture of 80 to 95 parts by weight of a polyoxypropylene diol with, correspondingly, 20 to 5 parts by weight of a polyoxypropylene triol, said polyoxypropylene diol having an average molecular weight within the range of about 1,000 to about 5,000 and containing about 10% to 60% primary hydroxyl groups, said polyoxypropylene triol having a molecular weight within the range of about 1,000 to about 6,000, the filler of said composition comprising 10% to 60% of the weight thereof, said polyol component also containing from about 0.05 to about 5 wt. percent of a catalyst selected from the group consisting of oxides, carboxylates and alcoholates of tin, lead and calcium, said polyol component and said isocyanate component being reacted in proportions sufficient to provide from about 1.1 to about 1.7 mol equivalents of isocyanato groups per hydroxyl group.

2. A method of preparing a pipe sealant which comprises pouring into the annulus of a circumferential mold releasably mounted on the end of a clay pipe, a mixture of an isocyanate component and a polyol component, said isocyanate component comprising from about 30 to about 80 wt. percent of an aromatic diisocyanate and, correspondingly, about 70 to about 20 wt. percent of an aromatic isocyanate having a functionality greater than two, the average functionality of said isocyanate component being about 2.1 to about 2.5, said polyol component comprising about 80 to 95 parts by weight of a polyoxypropylene diol containing terminal oxyethylene groups and, correspondingly, from about 20 to about 5 parts by weight of a polyoxypropylene triol containing terminal oxyethylene groups, and ethylene oxide content of said polyol component constituting from 1% to about 15% of the weight thereof, said diol having an average molecular weight within the range of about 1,000 to about 5,000, said triol having an average molecular weight within the range of about 1,000 to about 6,000, said mixture containing an inorganic filler constituting about 10% to about 60% of the weight thereof, said polyol component containing 0.05 to 5 wt. percent of a catalyst selected from the group consisting of oxides, carboxylates and alcoholates of a metal selected from the group consisting of tin, lead and calcium, said polyol component and said isocyanate component being mixed in proportions such that the resultant mixture contains about 1.1 to about 1.7 mol equivalents of isocyanato group per mol of hydroxyl group.

3. A method as in claim 2 wherein the polyisocyanate component is composed of polyphenylmethane polyisocyanates, wherein the polyol component contains about 5 to about 10 wt. percent of combined ethylene oxide, wherein the catalyst component consists essentially of a lead carboxylate and wherein the filler is selected from the group consisting of silica, carbon black and clay.

4. A product prepared by the process of claim 3.

References Cited

UNITED STATES PATENTS 3,148,162  9/1964  Gmitter et al. _____ 260—37

FOREIGN PATENTS 627,182  5/1963  Belgium.
1,309,892  10/1962  France.

MORRIS LIEBMAN, *Primary Examiner.*

B. B. AMERNICK, *Assistant Examiner.*